Figure 1:
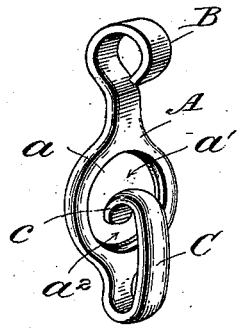

No. 652,905. Patented July 3, 1900.
F. SWALES.
CURB HOOK FOR BRIDLES.
(Application filed July 6, 1898.)

(No Model.)

Witnesses.
Jno. F. Cross
J. Henderson.

Inventor.
Frank Swales,
by Home Peters,
his Attorney.

UNITED STATES PATENT OFFICE.

FRANK SWALES, OF LONDON, ENGLAND.

CURB-HOOK FOR BRIDLES.

SPECIFICATION forming part of Letters Patent No. 652,905, dated July 3, 1900.

Application filed July 6, 1898. Serial No. 685,226. (No model.)

*To all whom it may concern:*

Be it known that I, FRANK SWALES, a subject of the Queen of Great Britain, and a resident of Brompton, London, England, have invented an Improved Curb-Hook, of which the following is a full, clear, and exact description, reference being had to the accompanying drawings, forming part of this specification.

This invention relates to an improved hook which is more especially, although not exclusively, intended for use as a "curb-hook" for connecting the curb-chain to a horse's bit.

According to my invention the hook consists of a body portion having an aperture or cavity therein, one end of said body portion being bent to form a loop or eye for permanent connection to the bit or other article and the other end being bent to form the hook portion, the free end of which forms a counter-hook and occupies approximately a central position relatively to the aforesaid aperture or cavity in the body portion. By this construction the chain-link can be readily and effectually connected with the hook without exerting vigorous pressure, as is necessary with ordinary curb-hooks. Moreover, the hook presents a smooth and flat surface at the back where it lies against the horse's skin and does not therefore cause the irritation which oftentimes arises with ordinary curb-hooks. It will also be clear that in this construction of hook herein described and claimed the counter-hook formed on the free end of the hook member materially tends to prevent the link from becoming accidentally disengaged from the hook. The link of a curb-chain by reason of the shaking of the horse's head and the rattling of the chain incident thereto is liable to become disengaged from the hook, especially when it is somewhat loosely drawn around the horse's jaw. In my improved construction the link when jarred or forced upwardly tends to come into contact with and be engaged by the counter-hook, which thus prevents the accidental passing of the link over the free end of the hook. The surrounding portions of the frame tend to guide and keep it in position in the hook, and it can only be displaced and removed from the hook by carefully raising the link to a given position at an angle to the face of the hook and intruding it while in this raised angular position within the aperture, and thus passing it over and beyond the reach of the counter-hook on the free end of the main hook member. It will be clear that in this construction of hook it would be almost impossible for a link accidentally to become disengaged from the counter-hook and to pass over the same at the required angle, so as to become disengaged. It will also be noted that in order to insure greater security the underbent portion of the counter-hook extends practically within the central aperture. The lower surface of the counter-hook within the aperture is turned and preferably somewhat rounded, so as to present a smooth non-pricking surface to that portion of the horse's skin which may protrude within said aperture against said surface of the counter-hook.

In order that my said invention may be clearly understood and readily carried into effect, I will proceed to describe the same more fully with reference to the accompanying drawings, which illustrate the hook in a form adapted for use as a curb-hook.

Figure 2:
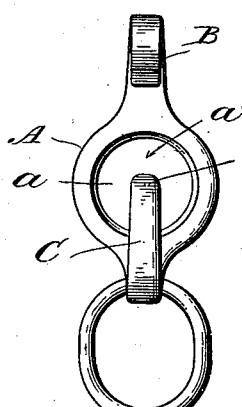
Figure 3:
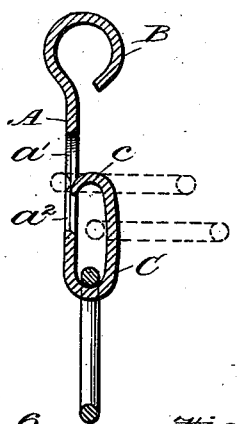
Figure 4:
Figure 5:
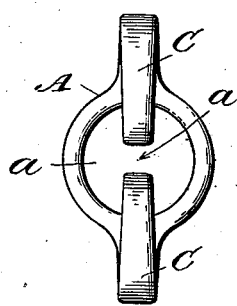
Figure 6:
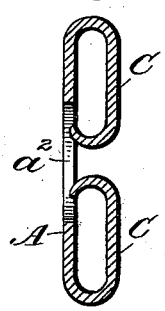
Figures 7, 8:
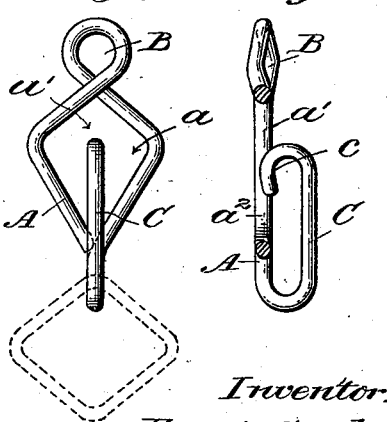

Figure 1 is a perspective view of my improved hook. Fig. 2 is a face view of the same. Fig. 3 is a central sectional view. Fig. 4 is a side elevation with the eye of the hook in the reversed form to that shown in Fig. 3. Fig. 5 represents a modified form of my invention. Fig. 6 is a central sectional view of Fig. 5. Fig. 7 is a face view, and Fig. 8 is a sectional elevation of a further modification.

In all the figures like reference-letters indicate similar parts.

A is the body portion of the hook; B, the eye at one end thereof; C, the bent or hook portion formed at the other end thereof, and $a$ is the aperture or cavity in the body portion. The free end of the hook portion C is bent inwardly, so as to form a counter-hook at $c$, and lies approximately central with respect to the aperture $a$, leaving a passage at $a'$, Fig. 3, for the link of the chain to enter the said aperture and a passage at $a^2$ for the link to enter into engagement with the hook portion.

On reference to Fig. 3 it will be seen that the link can only be disengaged from the hook by bringing it into a position substantially at right angles thereto to enable said link to enter the aperture $a$ a sufficient distance to permit of its passing through the passage $a^2$ and reaching the passage $a'$. It will be obvious that the link cannot unintentionally assume this position and reach the passage $a'$ while the hook is in use and the chain subjected to tension, although an extremely simple movement will disengage the link when it is intentionally brought into the aforesaid position. Any movement of the link while it lies approximately parallel with the hook-body (which is its position while engaged with the hook) will not enable it to become detached, because in such position it would engage with the counter-hook or bent end $c$ of the hook proper in the event of its shifting upward far enough to enter the aperture $a$.

The shape of the aperture or cavity $a$ is preferably circular, although it may in some instances be made of oval, rectangular, or other shape; but it should be made of such a diameter as to permit of the links being inserted partially into said aperture, as explained above with reference to Fig. 3.

In the example illustrated in Figs. 7 and 8 the hook is constructed of wire and has a rectangular aperture $a$. In this case the link may also be made rectangular, as shown in Fig. 7.

In the construction illustrated by Figs. 5 and 6 the body of the hook is provided with two of the aforesaid hook portions C, the free ends of which lie adjacent to each other and to the central point of the aperture $a$, with sufficient space between said ends to permit of a chain-link to be inserted between them in the act of connecting the same to the hook.

I do not confine myself to the use of the hook only as a curb-hook, as it may be used for any other purpose to which it is applicable.

When the hook is constructed with two hook portions C in the manner shown in Figs. 5 and 6, it can be used as a connecting-link or as a hook, according to requirements.

Having thus described my invention, what I claim, and desire to secure by Letters Patent, is—

1. As a new article of manufacture, a curb-hook comprising a main circular body portion having a centrally-disposed aperture formed therein, a hook member integral with the main body portion having its free end turned to form an underbent counter-hook extending into the central aperture within the planes of the front and rear faces of the main body portion, and means for attaching the hook at the opposite end, substantially as described.

2. In a curb-hook having a curved body portion centrally apertured and a curved arm integral with the main body portion forming the hook member, an underbent counter-hook formed on the free end of the main hook member having a rounded head extending into the central aperture within the planes of the front and rear faces of the main body portion, substantially as described.

In testimony whereof I have hereunto set my hand, in presence of two subscribing witnesses, this 24th day of June, 1898.

FRANK SWALES.

Witnesses:
F. W. McLELLAN,
WALTER J. SKERTEN.